United States Patent
Davies et al.

(10) Patent No.: US 12,235,961 B1
(45) Date of Patent: Feb. 25, 2025

(54) MALWARE MITIGATING STORAGE CONTROLLER

(71) Applicant: Seagate Technology LLC, Fremont, CA (US)

(72) Inventors: Ian Davies, Longmont, CO (US); Michael Barrell, Superior, CO (US); Douglas William Dewey, Longmont, CO (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 232 days.

(21) Appl. No.: 17/736,822

(22) Filed: May 4, 2022

(51) Int. Cl.
 *G06F 21/56* (2013.01)

(52) U.S. Cl.
 CPC ...... *G06F 21/568* (2013.01); *G06F 2221/034* (2013.01)

(58) Field of Classification Search
 CPC .......................... G06F 21/568; G06F 2221/034
 See application file for complete search history.

(56) References Cited

U.S. PATENT DOCUMENTS

| | | | |
|---|---|---|---|
| 8,732,825 B2 | 5/2014 | Park et al. | |
| 10,121,003 B1 | 11/2018 | Adams | |
| 10,262,138 B2 * | 4/2019 | Boutnaru | G06F 21/566 |
| 10,460,107 B2 | 10/2019 | Crofton et al. | |
| 10,733,290 B2 | 8/2020 | Berler et al. | |
| 10,735,462 B2 | 8/2020 | Sheri et al. | |
| 10,839,072 B2 * | 11/2020 | Pohl | G06F 3/0683 |
| 10,885,192 B2 * | 1/2021 | Bakthavatchalam | G06F 21/567 |
| 10,963,350 B2 * | 3/2021 | Bangalore | G06F 11/1461 |
| 11,232,206 B2 | 1/2022 | Chelarescu et al. | |
| 11,663,336 B1 * | 5/2023 | Armangau | G06F 21/561 726/23 |
| 11,983,270 B2 * | 5/2024 | Gaurav | G06F 16/2365 |
| 2011/0145527 A1 * | 6/2011 | Miller | G06F 3/0619 711/E12.103 |
| 2020/0099699 A1 | 3/2020 | Saad | |
| 2021/0334374 A1 | 10/2021 | Vasudeva et al. | |
| 2023/0153438 A1 * | 5/2023 | Bhagi | G06F 21/78 726/26 |
| 2023/0251800 A1 * | 8/2023 | Miyamura | G06F 3/0608 711/154 |

FOREIGN PATENT DOCUMENTS

| | | | | |
|---|---|---|---|---|
| CN | 110765071 A | * | 2/2020 | G06F 16/128 |
| WO | WO-2015063671 A1 | * | 5/2015 | G06F 19/366 |
| WO | WO-2023232246 A1 | * | 12/2023 | |

* cited by examiner

*Primary Examiner* — Christopher A Revak
(74) *Attorney, Agent, or Firm* — HOLZER PATEL DRENNAN

(57) ABSTRACT

A method for mitigating the effects of malware is provided. The method includes determining a compressibility of a portion of data, determining a data corruption condition is satisfied based on the determined compressibility, and modifying a retention policy for retention of stored snapshots associated with the portion of data based on the satisfaction of the data corruption condition. The modifying of the retention policy includes generating a first snapshot associated with the portion of the data, prior to writing cached data associated with the portion of the data, writing the cached data associated with the portion of the data, and generating a second snapshot associated with the portion of the data, responsive to the deletion.

18 Claims, 8 Drawing Sheets

MALWARE MITIGATING STORAGE CONTROLLER

BACKGROUND

Malware, such as ransomware, corrupts data stored in memory, including non-volatile storage. A common technique used by ransomware is to encrypt data on a computer system, making the data inaccessible by its owners. One attribute of encrypted data is its high entropy. High entropy data can be less compressible than low entropy data. Storage systems that compress data can detect data that happens to have been encrypted by ransomware as incompressible. Detecting the malware allows a computing system to isolate the corrupted data and to mitigate any negative effects caused by the data corruption. For example, the computing system could restore a version of the corrupted data stored in memory prior to the malware corruption.

SUMMARY

The described technology provides a method for mitigating the effects of malware. The method includes determining a compressibility of a portion of data, determining that a data corruption condition is satisfied based on the determined compressibility, and modifying a retention policy for retention of stored snapshots associated with the portion of data based on the satisfaction of the data corruption condition. The modifying of the retention policy includes generating a first snapshot associated with the portion of the data, prior to writing cached data associated with the portion of the data, writing the cached data associated with the portion of the data, and generating a second snapshot associated with the portion of the data, responsive to the writing.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
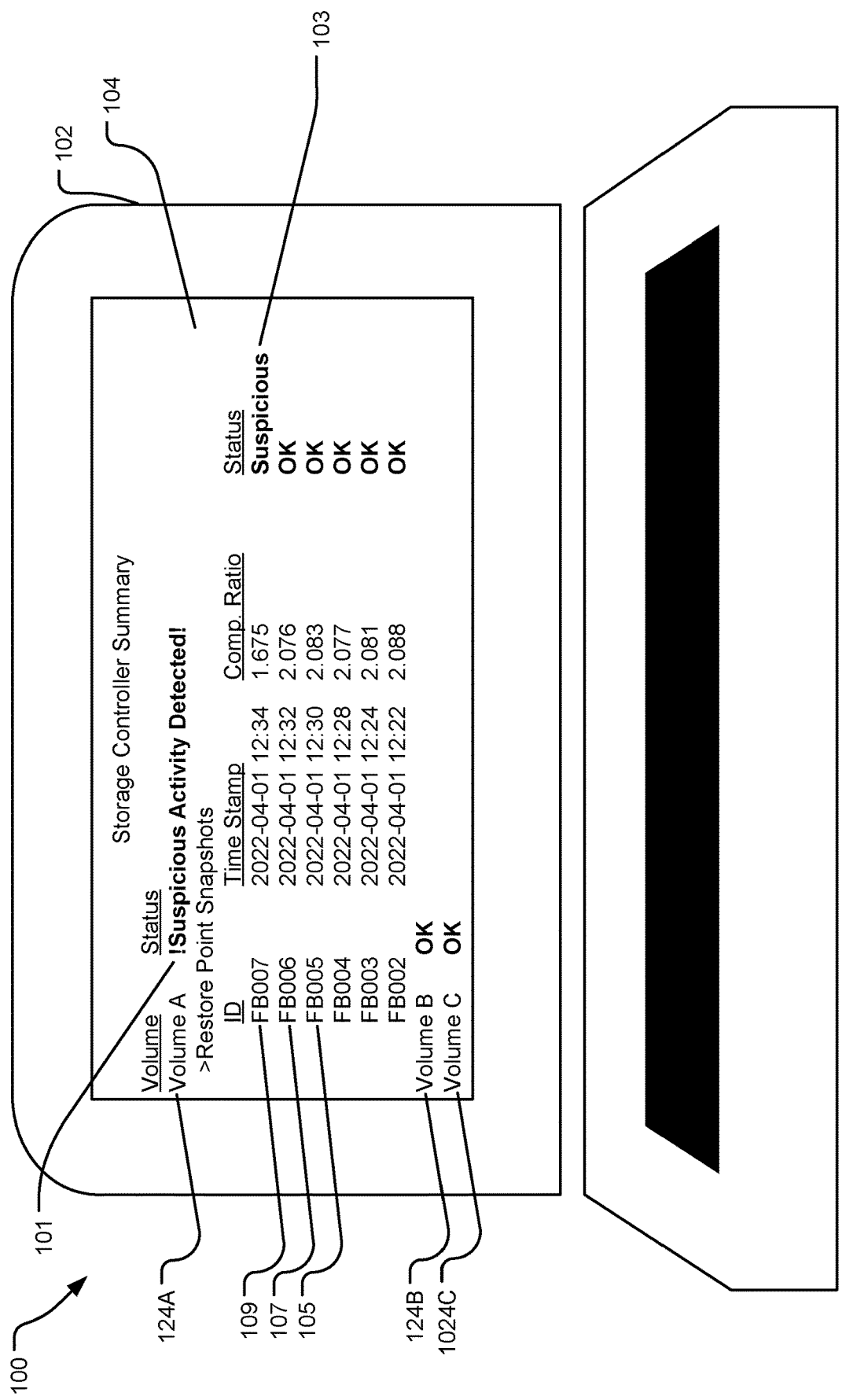
FIG. 1 illustrates an example computing device system with a malware mitigating storage controller.

Malware often operates by encrypting data, making the data inaccessible for execution. The encryption also makes it difficult or impossible for a computer system to compress the encrypted data, conferring high entropy to the data. Detecting the malware allows a computing system to isolate the corrupted data and to mitigate any negative effects of the data corruption. For example, the computing system could restore a version of the corrupted data stored in memory prior to the malware corruption.

Anti-Malware software executable in an operating system (OS) environment operates at a level removed from the hardware and often limits permissions of programs running in the OS to access storage volumes at a hardware level. For example, the OS prevents certain user processes from modifying system files that are likely to be attacked using malware. Similar issues may exist in block-based memory systems. Also, because anti-malware software executed within the OS is relatively accessible for manipulation, the fidelity of the detection software itself could be in question.

The presently disclosed technology provides a system in which a storage controller that directly controls one or more storage drives directly monitors memory regions of the one or more storage drives for suspicious activity that indicates the presence of malware. In implementations, data storage devices include one or more of solid-state disk drives (SSDs), hard disk drives (HDDs), hybrid drives, server systems, random access memory (RAM), read-only memory (ROM), and the like. Controlling the malware detection at the storage controller level may place the antimalware protocols in difficult to modify firmware within the storage device.

In an implementation, the storage controller compresses stored and/or incoming data to determine the compressibility of the stored and/or incoming data. The compressibility may be represented in a compression ratio (e.g., the size of the compressed data relative to the size of the uncompressed data). The compression ratio may be applied to one or more levels of data storage such as an entire drive, to a memory region within a drive, at a block level, at a file level, at a byte level, or at any other level of data storage. When a compressibility of a portion of data is determined, it can be compared with determined prior compressibilities of the portion of data to determine whether a data corruption condition is satisfied based at least in part on the currently and prior determined compressibilities.

As disclosed herein, vulnerable data that may be affected by malware may include one or more of stored data, data in transit, metadata representing stored data or data in transit, and snapshots of data. A data snapshot is a point-in-time copy of data stored in a memory region. In implementations, a data snapshot may include one or more of a complete copy of the data in the memory region, a pointer remapping of the memory region, and a copy-on-write copy of the memory region. Data the storage controller monitors to determine whether the vulnerable data is suspected of being or being affected by malware may include one or more of stored data, data in transit, metadata representing stored data or data in transit, and snapshots of data associated with the vulnerable data.

One method for restoring data to a prior state is by reverting to a data snapshot of a portion of memory. A data snapshot may be a complete copy of the data or a summary of changes to the data in the portion of memory to allow a computer system to restore the data in the portion of memory to a version saved or snapshotted (e.g., by a point-in-time data capture) prior to the corruption of data caused by a malware attack.

To refine a determination of whether compressibility of data indicates data corruption, a storage controller may modify a retention policy for retention of stored snapshots associated with a portion of data identified as potentially corrupt. In an implementation, the retention policy may be modified by one or more of adjusting the frequency at which stored snapshots are generated and adjusting a predefined number of stored snapshots. In implementations, the storage controller may instruct the storage device to generate a first data snapshot associated with the suspicious portion of data prior to writing (e.g., flushing) the cached data of the relevant storage device and a second data snapshot associated with the suspicious portion of data after writing the cached data of the storage device. The first and second snapshots may be compared, and, based on the comparison, the retention of at least a portion of one or more of stored snapshots and the portion of data is modified. The storage controller may additionally or alternatively restore data to a version represented in a prior snapshot. The storage controller may additionally or alternatively modify memory on which the suspicious portion of data is stored based on the first or second snapshot.

In implementations, the storage controller may be in communication with an OS of a computing device. The communication may be conducted over an API. The storage controller may be able to transmit and/or receive data for addressing corrupt data. For example, in an implementation, the OS may transmit (e.g., using an API with a proprietary instruction set) data representing identifying information to identify corrupted data. The identifying information may come in the form of the corrupted filenames or may come in the form of hashed data (e.g., predefined corrupt data hashes) that represent the corrupted data. The storage controller may additionally or alternatively be configured to transmit results of a data corruption determination and/or corrective measures taken in response to the data corruption to the OS (e.g., using an API with a proprietary instruction set). Further still, the storage controller may be able to receive commands from an OS to take corrective measures based on data provided by the storage controller to the OS regarding determinations made by the storage controller regarding the corruption of data.

The storage controller may be better positioned to determine data corruption than existing OS anti-malware programs, as the storage controller is closer in the data chain to data in storage. Further, the proprietary commands and infrastructure of the storage controller are harder to access from an OS level, making it more difficult for a bad actor to corrupt the protocols that control the storage controller. For example, the controller's antimalware protocols may be stored in firmware of the storage controller that uses proprietary code that is relatively inaccessible to most users (especially when compared with access to systems in the OS). Also, by assessing local snapshots of the storage device, the storage controller can assess the corruption of the data without worrying about errors in the file registries associated with the data at the OS level being propagated to the storage device and its associated storage controller.

FIG. 1 illustrates an example computing device system 100 with a malware mitigating storage controller. The computing device system 100 includes a computing device 102 that presents a user interface 104. The user interface provides an indication of a storage controller summary that summarizes activity associated with a storage controller. The storage controller controls Volume A 124A, Volume B 124B, and Volume C 124C of one or more data storage devices. The user interface entry regarding Volume A 124A has been expanded to display snapshots of Volume A 124A. A most recent data snapshot 109 indicates a "suspicious" status 103. When compared with prior data snapshots 107 and 105, the compression ratio of the most recent data snapshot 109 is considerably lower. This may indicate that data stored in Volume A 106A or to be introduced to Volume A 124A has been encrypted by malware. When data is encrypted in a manner unrecognized by the storage controller, the data cannot be parsed and assembled for compression. In the illustrated implementation, the compression ratio of 1.675 for the most recent data snapshot 109 may be sufficiently different from the compression ratio of 2.076 for the prior data snapshot 107 to satisfy a data corruption condition, causing the status of the most recent data snapshot 109 to be flagged as "suspicious." This may cause the computing device system 100 to flag Volume A 124A as having a "!Suspicious Activity Detected!" status 101.

Figure 2:
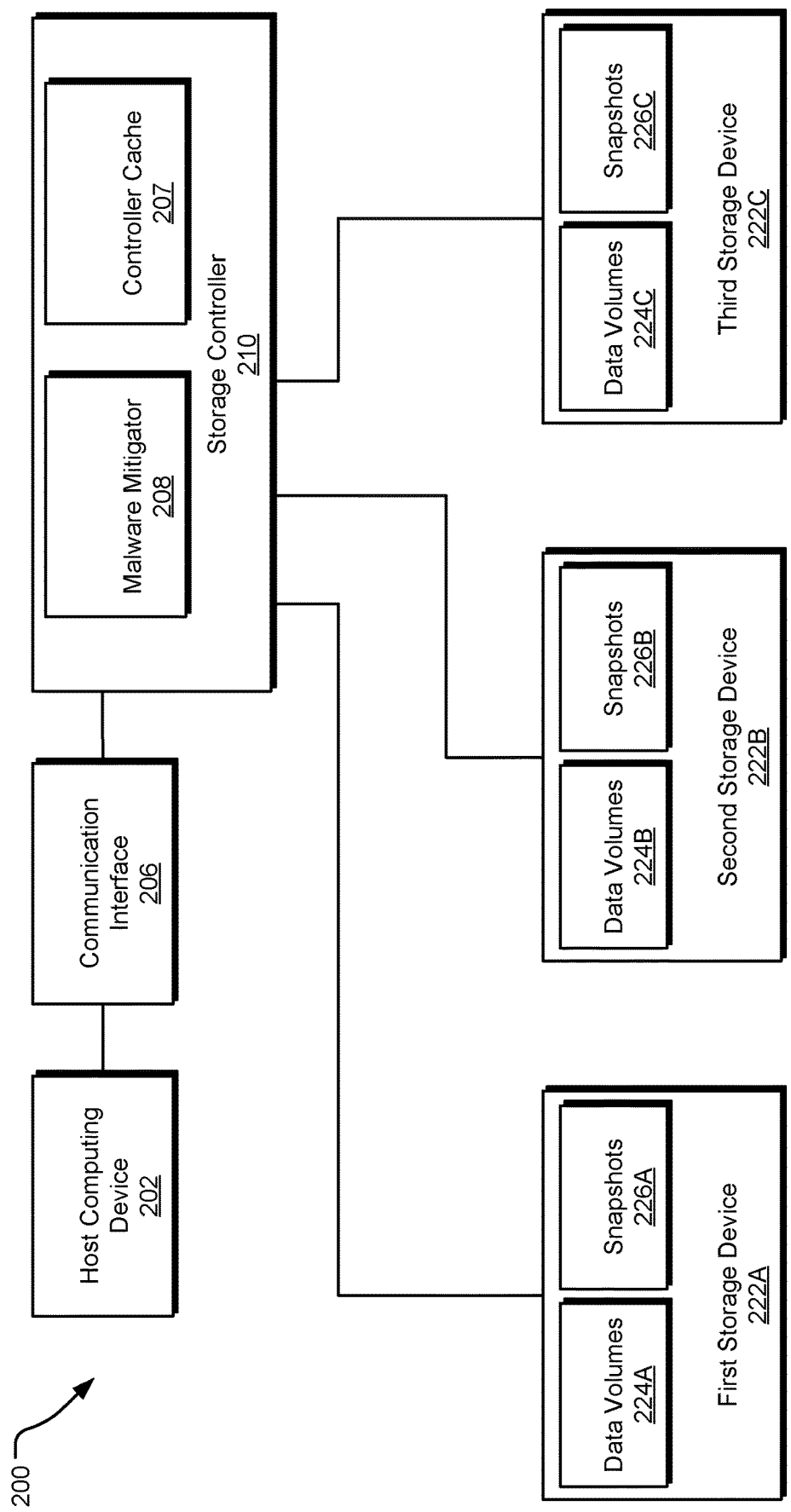
FIG. 2 illustrates a block diagram of an example computing system with a malware mitigating storage controller.

FIG. 2 illustrates a block diagram of an example computing system 200 with a malware mitigating storage controller. In the illustrated implementation, a host computing device 202 is communicatively coupled with a storage controller 210 via a communication interface 206 (e.g., an input/output interface). The storage controller 210 controls activities of storage devices 222A-C. Implementations are also contemplated in which the storage controller 210 is integral to one storage drive (e.g., a single SSD, HDD, or hybrid drive) such that the storage controller 210 exclusively controls that storage drive.

The storage controller 210 includes a malware mitigator 208 which may include one or more of software and hardware dedicated to mitigating the effects of malware in storage devices 222A-C. The malware mitigator 208 may detect and/or respond to suspicious data indicative of a malware attack. As described herein, the actions of the malware mitigator 208 may be attributable to the storage controller 210 of which the malware mitigator 208 is an element. Each of the storage devices 222A-C includes respective data volumes 224A-C and data snapshots 226A-C. While illustrated as distinct elements, implementations are contemplated in which memory of the storage devices 222A-C comingles data associated with the data volumes 224A-C and the data snapshots 226A-C in the memory of the storage devices 222A-C.

The data volumes 224A-C represent current versions of the data stored in the storage devices 222A-C. It should be appreciated that the data volumes 224A-C may be indexed or referenceable at any level of data storage as discussed herein. Vulnerable data that may be affected by malware may include one or more of stored data, data in transit, metadata representing stored data, metadata representing data in transit, and snapshots of data. Similarly, data the storage controller 210 monitors to determine whether the vulnerable data is suspected of being or being affected by malware may include one or more of stored data, data in transit, metadata representing stored data or data in transit, and snapshots of data associated with the vulnerable data. The data snapshots 226A-C may represent prior data states for the data stored in the data volumes 224A-C. For example, the snapshots may include entire copies of prior versions of the stored in the data volumes 224A-C or may store changes to the stored data over time with references to current data and with stored removed data to reduce the storage footprint of the data snapshots 226A-C.

The storage controller 210 and/or its malware mitigator 208 may communicate with an operating system (OS) of the host computing device 202 (e.g., to collaborate on malware mitigation or transfer data). The firmware of the storage controller 210 may include communication protocols for communicating with the host computing device 202 via the communication interface 206. In implementations, the storage controller 210 may include firmware instruction sets accessible by an application programming interface (API). The API may include specific instruction sets for communicating malware mitigation data between the storage controller 210 and the host computing device 202. The malware mitigation data may include one or more of predefined data representing malware, predefined data representing data affected by malware, malware detections, suspicious data detections, instructions to take responsive actions (e.g., mitigating actions), retention policy modification instructions, instructions to modify data properties (e.g., read access and/or write access), instructions to quarantine suspicious data, instructions to prevent garbage cleanup, instructions to prevent writing of cached data, instructions to write cached data, instructions to prevent flushing of cache, instructions to flush cache, instructions to modify a data retention policy, instructions to take a snapshot, instructions to modify the number of stored snapshots, instructions to modify the frequency at which snapshots are taken, instructions to perform any other stated functions of the elements described herein (e.g., functions of host computing device 202, the malware mitigator 208, and/or the storage controller 210). In implementations, malware mitigation software (e.g., antimalware, adware remover, or antivirus software) executable on the OS of the host computing device 202 can communicate malware mitigation data with and otherwise access malware mitigation functions of the storage controller 210 and its malware mitigator 208 to cooperate in mitigating the effects of malware.

The malware mitigator 208 may determine the compressibility of one or more of data to be written (e.g., data transmitted from the host computing device 202 to be written to a data volume 224A-C) or data already written to a data volume 224A-C at any level of data storage. The determined compressibility may include a compression ratio. Equation 1 shows an example equation for determining the compression ratio.

$$\text{Compression Ratio} = \frac{\text{Size of Uncompressed Data}}{\text{Size of Compressed Data}} \quad (1)$$

The determined compressibility may additionally or alternatively include a compression ratio based on a rate of data exchange (e.g., to determine the compressibility of incoming data). Equation 2 shows an example equation for determining compression ratio based on a rate of data exchange.

$$\text{Compression Ratio} = \frac{\text{Uncompressed Data Rate}}{\text{Compressed Data Rate}} \quad (2)$$

Higher compression ratios indicate that data is more compressible. Lower compression ratios indicate that data is less compressible. A lower compression ratio may indicate higher entropy and the potential presence of malware in the storage devices 222A-C. The storage controller 210 may use any compression method to compress the data (e.g., Lempel-Ziv compression). The storage controller 210 may determine the compressibility of the data as the data is written.

Depending on the determined compressibility of the data, the malware mitigator 208 may determine whether a data corruption condition is satisfied. For example, the storage controller may detect that a compressibility of data including one or more of a current compressibility of the data and a change in compressibility of the data satisfies a data corruption condition. To determine the satisfaction of the data corruption condition, the malware mitigator 208 may compare the compressibility or change in compressibility with a predefined threshold compressibility value or a predefined threshold compressibility change value. Alternatively or additionally, the malware mitigator 208 may compare the compressibility or change in compressibility with a predefined compressibility range or a predefined compressibility change range.

The malware mitigator 208 may emphasize investigating the compressibility of metadata. The storage controller 210 and/or the host computing device 202 may allocate special logical block addresses or other memory addresses for storing metadata, and data in these memory regions are not typically not encrypted. Detecting reduced compressibility of data in those memory areas dedicated to metadata may be more likely to indicate that malware is affecting data in the memory areas. The malware mitigator 208 may also look to determine whether other data that is predefined to be unencrypted, such as database files and host system metadata, are incompressible. The malware mitigator 208 may also look to see if compressible data is overwritten with incompressible data. In ransomware attacks, the malware typically attempts to encrypt as much data as practicable to incentivize a user to pay a ransom, and this will likely lead to areas that are never or at least seldomly encrypted being encrypted, decreasing the compressibility of the data. The malware mitigator 208 focusing its search in areas in which data is rarely or never encrypted may help isolate the malware and/or data affected by the malware.

If the data corruption condition is satisfied, the storage controller 210 and/or its malware mitigator 208 may determine that the data that satisfies the data corruption condition is suspicious data and may take one or more responsive actions. These responsive actions may include modifying a data retention policy associated with the suspicious data. Typically, the storage controller 210 will be preconfigured to save a predefined number of snapshots (deleting the oldest ones to maintain the predefined number) and to store snapshots at predefined times (e.g., a predefined frequency or responsive to predefined actions). The data retention policy may affect the retention of the snapshots associated with the suspicious data such as the number of data snapshots 226A-C associated with the suspicious data retained in the storage devices 222A-C and/or the frequency at which the data snapshots 226A-C associated with the suspicious data are generated in the storage devices 222A-C. The frequency or number of snapshots may be modified for one or more of all data in a storage device 222A in which the suspicious data is stored, may be modified for a specific memory region in which the data is stored within the storage device 222A (e.g., a data volume 224A, a block, a byte, a file, or any other level of data storage), may be modified for cache associated with the storage device 222A (e.g., controller cache 207) that stores the suspicious data, or may be modified for snapshots that represent the suspicious data (e.g., that store data for restoring the suspicious data to a prior version). In implementations, the data retention policy may instruct the storage controller 210 to take an emergency snapshot of the suspicious data (or a memory region at the level of data storage at which the snapshots are taken that includes the suspicious data) at the moment the data corruption is suspected and/or determined.

In implementations, data to be written to the storage devices 222A-C is first placed in controller cache 207. In implementations, the operations involved in taking a snapshot may include in sequence one or more of suspending writes from the host computing device 206 to the controller cache 207, writing (e.g., flushing) the remaining data in the controller cache 207 to non-volatile memory of a storage device 222A-C to which the data to be flushed is addressed, take a snapshot (e.g., by updating metadata to track a current image of the volumes data to be snapshotted), and reenabling writes from the host. Some or all of these steps may be conducted by or in coordination with the malware mitigator 208 when suspicious activity is detected. Although illustrated as if the snapshots are discretely stored in individual storage devices 222A-C, in implementations, data of a snapshot is stored across two or more of the storage devices 222A-C, and the malware mitigator 208 may conduct its operations across the two or more storage devices 222A-C accordingly.

In an implementation, a modification of a data retention policy includes capturing a first snapshot associated with the suspicious data prior to writing (e.g., flushing) the cached data from the write or write-back cache of the controller cache 207 to the first storage device 222A on which the suspicious data is stored (e.g., skipping the writing operation in the aforementioned snapshot sequence), writing the cached data to non-volatile storage of the first storage device 222A, and then capturing a second snapshot associated with suspicious data after the storage device 222A cache is written (consistent with the aforementioned snapshot sequence). The first and second snapshots may be taken in response to the detection of suspicious activity and may be other than scheduled snapshots taken in the regular course of operation (e.g., emergency snapshots).

The first and second snapshots may paint a more robust picture of whether the data identified as suspicious data is more likely to indicate a malware attack. Also, systems typically flush the storage device 222A cache before taking snapshots, so a snapshot that does not include the cached data (e.g., the first snapshot) can help reveal the activities of malware that may be operating if suspicious data is detected. For example, the first and second snapshots can be compared to determine which blocks of memory (or other level of data storage) were to be modified by the cache writes. The blocks may be isolated as potential locations of the malware attack. In an implementation, the isolated blocks could be transmitted to an operating system in the host computing device 202 to indicate that the blocks are suspicious. The operating system could responsively consult a local file system to determine which files are likely to be affected by malware within the blocks. Alternatively or additionally, in implementations, the storage controller may compare the compressibility of the isolated blocks to see if the compressibility of the blocks satisfies a corruption condition. By focusing on the blocks, the changes in compressibility may be more significant than ones over an entire volume and may provide better resolution. Additionally or alternatively, the storage controller cache can be monitored to determine whether any suspicious files are to be introduced to the storage devices 222A-C.

The data retention policy may also affect the treatment of the suspicious data stored in the data volumes 224A-C. For example, the data retention policy may be adjusted to erase the suspicious data and/or revert the suspicious data to a prior version represented in a prior snapshot. The data retention policy may also modify access to one or more of the suspicious data or a snapshot associated with the suspicious data such as by adjusting one or more of read access, write access, indexing, and the like of the suspicious data. The data retention policy may also modify the frequency of garbage collection in a portion of memory in which the vulnerable data is stored. For example, data volumes 224A-C may compress data as a matter of course and may copy the compressed data to a different memory region from the memory region that stored the uncompressed data. In situations in which the data is not considered suspicious, the uncompressed data may then be deleted during garbage collection. In implementations, if the data is insufficiently compressible (e.g., fails to satisfy a minimum compressibility condition), the original data may be maintained instead of being deleted during garbage collection. The original data may be maintained for a predetermined amount of time or until a triggering event (e.g., an instruction to resume garbage collection in the memory region in which the original data is stored in response to a notification that the data has been restored and/or is no longer under suspicion) is detected.

In implementations, the data corruption condition may additionally or alternatively include a determination of whether vulnerable data stored in the data volumes 224*a-c* matches predefined data that represents malware or data affected by malware. For example, the storage controller 210 may have access to predefined corrupt data representing stored malware or data affected by malware. The predefined corrupt data may be provided by the OS of the host computing device 202 to the malware mitigator 208. The predefined corrupt data may be in the form of hashed data representing malware or hashed data representing data manipulated by the malware that should be flagged as suspicious data. The hashes may be generated in the regular course of operation of the storage controller 210 during deduplication procedures that use hashed data to determine data that is redundant. In alternative implementations, the predefined data may not be hashed. The malware mitigator 208 compares the predefined corrupt data to the vulnerable data to determine similarity (e.g., to determine a predefined quantity or quality of consistent data), and, based on the comparison, the malware mitigator 208 may determine the presence of malware or vulnerable data that has been corrupted by the malware. This may be used independently to find malware or may be used as an element of the data corruption condition that reinforces whether vulnerable data is suspicious data. The instructions and malware mitigation data may be communicated between one or more of the host computing device 202, the OS of the host computing device, malware mitigation programs executable within the OS, the storage controller 210, and the storage controller's 210 malware mitigator 208. Permissions can be set (e.g., via the storage controller 210 firmware and/or API) to allow the OS and/or a malware mitigation program on the OS to control functions of the storage controller 210 and/or its malware mitigator 208.

The malware mitigator 208 may check the compressibility or change in compressibility at predefined rates or in response to predefined events. For example, the malware mitigator 208 may check the compressibility or change in compressibility of vulnerable data at the time data is introduced to the storage controller 210, at the time vulnerable data is modified within a first storage device 222A-C on which the vulnerable data is stored, at a time a snapshot of the vulnerable data is taken, at the request of a user, at the request of the OS of the host computing device 202, at the request of an anti-malware software of the host computing device 202, at regular intervals, at a time metadata associated with vulnerable data is modified, and at a time when suspicious data is detected in a same storage device 222A-C as the vulnerable data.

Figure 3:
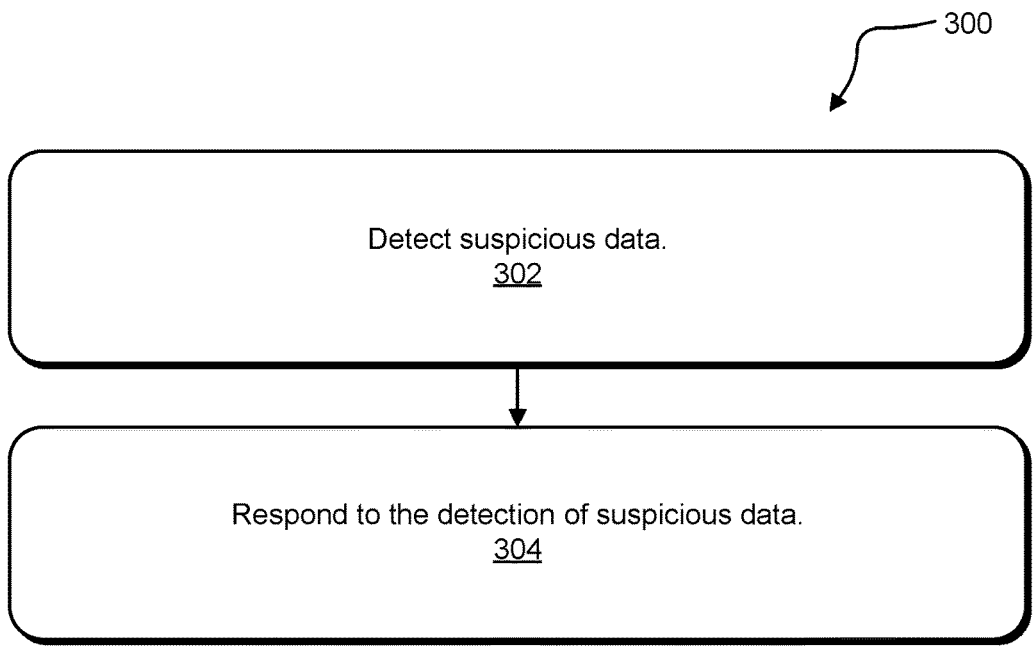
FIG. 3 illustrates example operations for mitigating the effects of malware.

FIG. 3 illustrates example operations 300 for mitigating the effects of malware. A detecting operation 302 detects suspicious data. The detecting operation 302 may instruct a malware mitigator of a storage controller to determine a compressibility of one or more of data to be written or data already written to a data volume at any level of data storage. The determined compressibility may include a compression ratio. Equation 1 shows an example equation for determining the compression ratio. The determined compressibility may additionally or alternatively include a compression ratio based on a rate of data exchange (e.g., to determine a compressibility of incoming data). Equation 2 shows an example equation for determining compression ratio based on a rate of data exchange. Higher compression ratios indicate that data is more compressible. Lower compression ratios indicate that data is less compressible. A lower compression ratio may indicate higher entropy and the potential presence of malware in the storage devices. The storage controller may use any compression method to compress the data (e.g., Lempel-Ziv compression). The storage controller may determine the compressibility of the data as the data is written.

Depending on the determined compressibility of the data, the malware mitigator may determine whether a data corruption condition is satisfied. For example, the storage controller may detect that a compressibility of data including one or more of a current compressibility of the data and a change in compressibility of the data satisfies a data corruption condition. To determine the satisfaction of the data corruption condition, the malware mitigator may compare the compressibility or change in compressibility with a predefined threshold compressibility value or a predefined threshold compressibility change value. Alternatively or additionally, the malware mitigator may compare the compressibility or change in compressibility with a predefined compressibility range or a predefined compressibility change range.

The malware mitigator may emphasize investigating the compressibility of metadata. The storage controller and/or the host computing device may allocate special logical block addresses or other memory addresses for storing metadata, and data in these memory regions are not typically not encrypted. Detecting reduced compressibility of data in those memory areas dedicated to metadata may be more likely to indicate that malware is affecting data in the memory areas. The malware mitigator may also look to determine whether other data that is predefined to be unencrypted, such as database files and host system metadata, are incompressible. The malware mitigator may also look to see if compressible data is overwritten with incompressible data. In ransomware attacks, the malware typically attempts to encrypt as much data as practicable to incentivize a user to pay a ransom, and this will likely lead to areas that are never or at least seldomly encrypted being encrypted, decreasing the compressibility of the data. The malware mitigator focusing its search in areas in which data is rarely or never encrypted may help isolate the malware and/or data affected by the malware.

In implementations, the data corruption condition may additionally or alternatively include a determination of whether vulnerable data stored in the data volumes matches predefined data that represents malware or data affected by malware. For example, the storage controller may have access to predefined corrupt data representing stored malware or data affected by malware. The predefined corrupt data may be provided by the OS of the host computing device to the malware mitigator. The predefined corrupt data may be in the form of hashed data representing malware or hashed data representing data manipulated by the malware that should be flagged as suspicious data. The hashes may be generated in the regular course of operation of the storage controller during deduplication procedures that use hashed data to determine data that is redundant. In alternative implementations, the predefined data may not be hashed. The malware mitigator compares the predefined corrupt data to the vulnerable data to determine similarity (e.g., to determine a predefined quantity or quality of consistent data), and, based on the comparison, the malware mitigator may determine the presence of malware or vulnerable data that has been corrupted by the malware. This may be used independently to find malware or may be used as an element of the data corruption condition that reinforces whether vulnerable data is suspicious data. The instructions and malware mitigation data may be communicated between one or more of the host computing device, the OS of the host computing device, malware mitigation programs executable within the OS, the storage controller, and the storage controller's malware mitigator. Permissions can be set (e.g., via the storage controller firmware and/or API) to allow the OS and/or a malware mitigation program on the OS to control functions of the storage controller and/or its malware mitigator.

The malware mitigator may check the compressibility or change in compressibility at predefined rates or in response to predefined events. For example, the malware mitigator may check the compressibility or change in compressibility of vulnerable data at the time data is introduced to the storage controller, at the time vulnerable data is modified within a first storage device on which the vulnerable data is stored, at a time a snapshot of the vulnerable data is taken, at the request of a user, at the request of the OS of the host computing system, at the request of an anti-malware software of the host computing system, at regular intervals, at a time metadata associated with vulnerable data is modified, and at a time when suspicious data is detected in a same storage device as the vulnerable data.

Responding operation 304 responds to the detection of suspicious data. If the data corruption condition is satisfied, the storage controller and/or its malware mitigator may determine that the data that satisfies the data corruption condition is suspicious data and may take one or more responsive actions. These responsive actions may include modifying a data retention policy associated with the suspicious data. Typically, the storage controller will be preconfigured to save a predefined number of snapshots (deleting the oldest ones to maintain the predefined number) and to store snapshots at predefined times (e.g., a predefined frequency or responsive to predefined actions). The data retention policy may affect the retention of the snapshots associated with the suspicious data such as the number of data snapshots associated with the suspicious data retained in the storage devices and/or the frequency at which the data snapshots associated with the suspicious data are generated in the storage devices. The frequency or number of snapshots may be modified for one or more of all data in a storage device in which the suspicious data is stored, may be modified for a specific memory region in which the data is stored within the storage device (e.g., a data volume, a block, a byte, a file, or any other level of data storage), may be modified for cache associated with the storage device that stores the suspicious data, or may be modified for snapshots that represent the suspicious data (e.g., that store data for restoring the suspicious data to a prior version). In implementations, the data retention policy may instruct the storage controller to take an emergency snapshot of the suspicious data (or a memory region at the level of storage at which the snapshots are taken that includes the suspicious data) at the moment the data corruption is suspected and/or determined.

In an implementation, a modification of a data retention policy includes capturing a first snapshot associated with the suspicious data prior to writing (e.g., flushing) cached data (e.g., data in write or write-back cache in the storage controller) of the first storage device on which the suspicious data is stored, writing the cached data of the first storage device to non-volatile storage of the first storage device, and then capturing a second snapshot associated with suspicious data after the storage device's cached data is written. The first and second snapshots may be taken in response to the detection of suspicious activity and may be other than scheduled snapshots taken in the regular course of operation (e.g., emergency snapshots).

The first and second snapshots may paint a more robust picture of whether the data identified as suspicious data is more likely to indicate a malware attack. Also, systems typically flush the storage device's cached data cached in the storage device controller before taking snapshots, so a snapshot that does not include the cached data (e.g., the first snapshot) can help reveal the activities of malware that may be operating if suspicious data is detected. For example, the first and second snapshots can be compared to determine which blocks of memory (or other level of data storage) were to be modified by the cache writes. The blocks may be isolated as potential locations of the malware attack. In an implementation, data representing the isolated blocks could be transmitted to an operating system in the host computing device to indicate that the blocks are suspicious. The operating system could responsively consult a local file system to determine which files are or are likely to be affected by malware within the blocks. Alternatively or additionally, in implementations, the storage controller may compare the compressibility of the isolated blocks to see if the compressibility of the blocks satisfies a corruption condition. By focusing on the blocks, the changes in compressibility may be more significant than ones over an entire volume and may provide better resolution. Additionally or alternatively, the storage controller cache can be monitored to determine whether any suspicious files are to be introduced to the storage devices.

The data retention policy may also affect the treatment of the suspicious data stored in the data volumes. For example, the data retention policy may be adjusted to erase the suspicious data and/or revert the suspicious data to a prior version represented in a prior snapshot. The data retention policy may also modify access to one or more of the suspicious data or a snapshot associated with the suspicious data such as by adjusting one or more of read access, write access, indexing, and the like of the suspicious data. The data retention policy may also modify the frequency of garbage collection in a portion of memory in which the vulnerable data is stored. For example, data volumes may compress data as a matter of course and may copy the compressed data to a different memory region from the memory region that stored the uncompressed data. In situations in which the data is not considered suspicious, the uncompressed data may then be deleted during garbage collection. In implementations, if the data is insufficiently compressible (e.g., fails to satisfy a minimum compressibility condition), the original data may be maintained instead of being deleted during garbage collection. The original data may be maintained for a predetermined amount of time or until a triggering event (e.g., an instruction to resume garbage collection in the memory region in which the original data is stored in response to a notification that the data has been restored and/or is no longer under suspicion) is detected.

The detecting operation 302 and the responding operation 304 may be conducted in conjunction with one or more of a host computing system, an operating system of the host computing system, and a program executable in the OS. The storage controller and/or its malware mitigator may communicate with an operating system (OS) of the host computing device (e.g., to collaborate on malware mitigation or transfer data). The firmware of the storage controller may include communication protocols for communicating with the host computing device via the communication interface. In implementations, the storage controller may include firmware instruction sets accessible by an application programming interface (API). The API may include specific instruction sets for communicating malware mitigation data between the storage controller and the host computing device. The malware mitigation data may include one or more of predefined data representing malware, predefined data representing data affected by malware, malware detections, suspicious data detections, instructions to take responsive actions (e.g., mitigating actions), retention policy modification instructions, instructions to modify data properties (e.g., read access and/or write access), instructions to quarantine suspicious data, instructions to prevent garbage cleanup, instructions to prevent writing (e.g., flushing) of cached data, instructions to write (e.g., flush) cached data, instructions to modify a data retention policy, instructions to take a snapshot, instructions to modify the number of stored snapshots, instructions to modify the frequency at which snapshots are taken, instructions to perform any other stated functions of the elements described herein (e.g., functions of host computing device, the malware mitigator, and/or the storage controller). In implementations, malware mitigation software (e.g., antimalware, adware remover, or antivirus software) executable on the OS of the host computing device can communicate malware mitigation data with and otherwise access malware mitigation functions of the storage controller and its malware mitigator to cooperate in mitigating the effects of malware.

Figure 4:
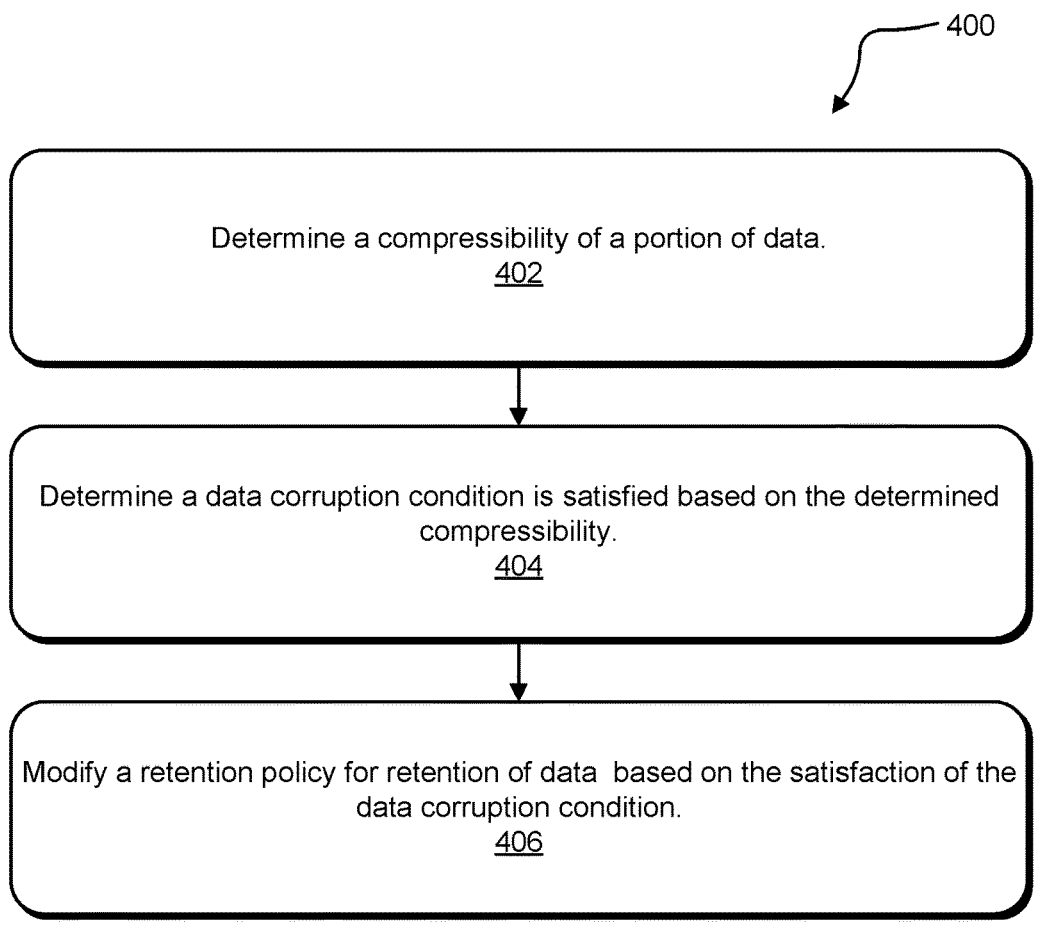
FIG. 4 illustrates other example operations for mitigating the effects of malware.

FIG. 4 illustrates other example operations 400 for mitigating the effects of malware. A determining operation 402 determines a compressibility of a portion data. The determining operation 402 instructs the storage controller to compress the portion of the data. The uncompressed size of the portion of data is compared with the compressed size of data to determine a compressibility (e.g., a compression ratio calculable using one or more of equations 1 and 2 presented herein). The determined compressibility may additionally or alternatively include a change in compressibility of the data portion.

A determining operation 404 determines a data corruption condition is satisfied based on the determined compressibility. In implementations in which the compressibility includes a compressibility value, the data corruption condition may include a predefined compressibility threshold or a predefined compressibility range. In implementations in which the compressibility includes a compressibility change value. The data corruption condition may include a compressibility change threshold or a predefined compressibility change range. The determining operation 404 may determine that the determined compressibility satisfies a condition (e.g., satisfies or fails a threshold or range). The determining operation 402 and the determining operation 406 may be implementations of the detecting operation 302.

A modifying operation 406 modifies a data retention policy for retention of data based on the satisfaction of the data corruption condition. The modified data retention policy may modify a policy for data storage for the portion of data or other data associated with the portion of data (e.g., a snapshot, cache, or metadata). The modifying operation 406 may be an implementation of responding operation 304.

In a specific implementation, the modifying operation 406 modifies a retention policy for retention of stored snapshots associated with the portion of data based on the satisfaction of the data corruption condition.

Figure 5:
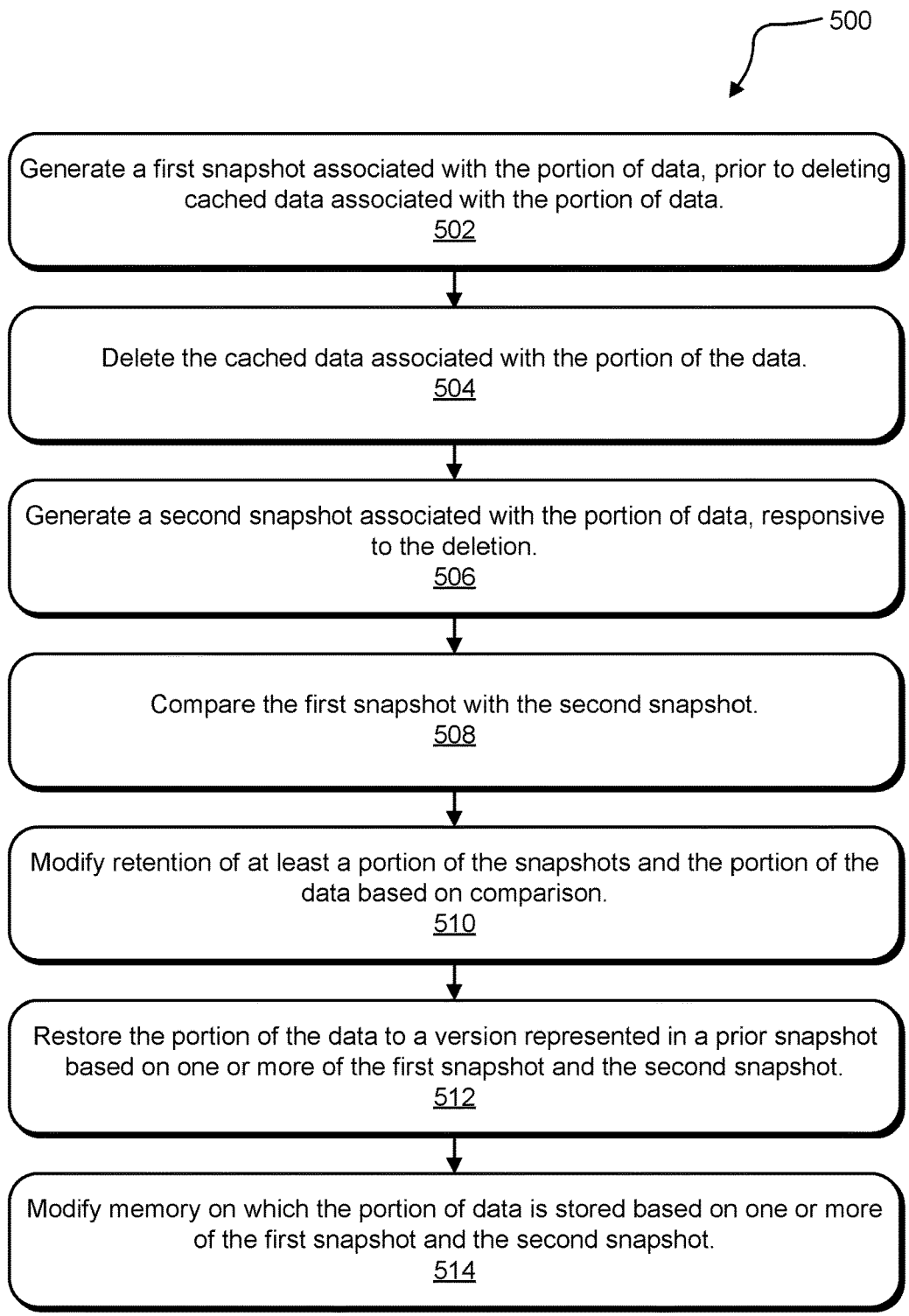
FIG. 5 illustrates example operations for modifying a retention policy of data snapshots.

FIG. 5 illustrates example operations 500 for modifying a retention policy of data snapshots. Operations 500 may be implementations of the responding operation 304. A generating operation 502 generates a first snapshot associated with the portion of data, prior to writing cached data in cache of a storage controller, the cached data associated with the portion of data. A writing operation 504 writes the cached data associated with the portion of data. A generating operation 506 generates a second snapshot associated with the portion of data responsive to the writing operation 504. Storing a first snapshot that does not include cached data can provide insight as to what malware may be doing at a given time. The second snapshot that includes the written cached data can also provide perspective as to what files were affected.

The first and second snapshots may paint a more robust picture of whether the data identified as suspicious data is more likely to indicate a malware attack. Also, systems typically flush the storage device cache before taking snapshots, so a snapshot that does not include the cached data (e.g., the first snapshot) can help reveal the activities of malware that may be operating if suspicious data is detected. For example, the first and second snapshots can be compared to determine which blocks of memory (or other level of data storage) were to be modified by the cache writes. The blocks may be isolated as potential locations of the malware attack. In an implementation, the isolated blocks could be transmitted to an operating system in the host computing device to indicate that the blocks are suspicious. The operating system could responsively consult a local file system to determine which files are likely to be affected by malware within the blocks. Alternatively or additionally, in implementations, the storage controller may compare the compressibility of the isolated blocks to see if the compressibility of the blocks satisfies a corruption condition. By focusing on the blocks, the changes in compressibility may be more significant than ones over an entire volume and may provide better resolution. A compressibility of the first and second snapshots and/or a compressibility of the data that is different in the snapshots can additionally or alternatively be compared to inform whether and where a malware attack is occurring. Additionally or alternatively, the storage controller cache can be monitored to determine whether any suspicious files are to be introduced to the storage devices.

Operations 508-514 include other potential modifications of a data retention policy. A comparing operation 508 compares data representing (e.g., compression data) the first snapshot with data representing the second snapshot. A comparison of the first and second snapshots can provide knowledge of the changes the suspected malware was attempting to make. A modifying operation 510 modifies the retention of at least a portion of the snapshots and the portion of the data based on the comparison of comparing operation 508. A restoring operation 512 restores the portion of the data to a version represented in a prior snapshot based on one or more of the first snapshot and the second snapshot. A modifying operation 514 modifies memory on the portion of data is stored based on one or more of the first snapshot and the second snapshot. In implementations, the operations 500 may omit any of the deleting operation 504, the generating operation 506, the comparing operation 508, the modifying operation 510, the restoring operation 512, and the modifying operation 514.

Figure 6:
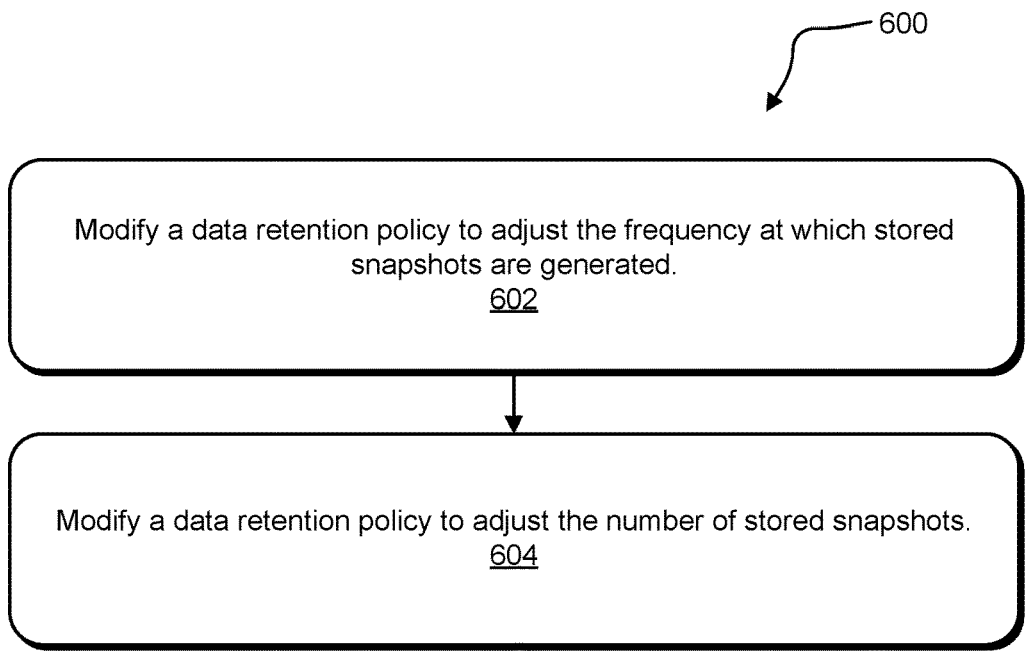
FIG. 6 illustrates other example operations for modifying a data retention policy.

FIG. 6 illustrates other example operations 600 for modifying a data retention policy. Operations 600 may be implementations of the responding operation 304. A modifying operation 602 modifies a data retention policy to adjust the frequency at which the stored snapshots are generated. A modifying operation 604 modifies a data retention policy to adjust the number of stored snapshots. In implementations, either of the modifying operation 602 and the modifying operation 604 may be omitted from operations 600.

Figure 7:
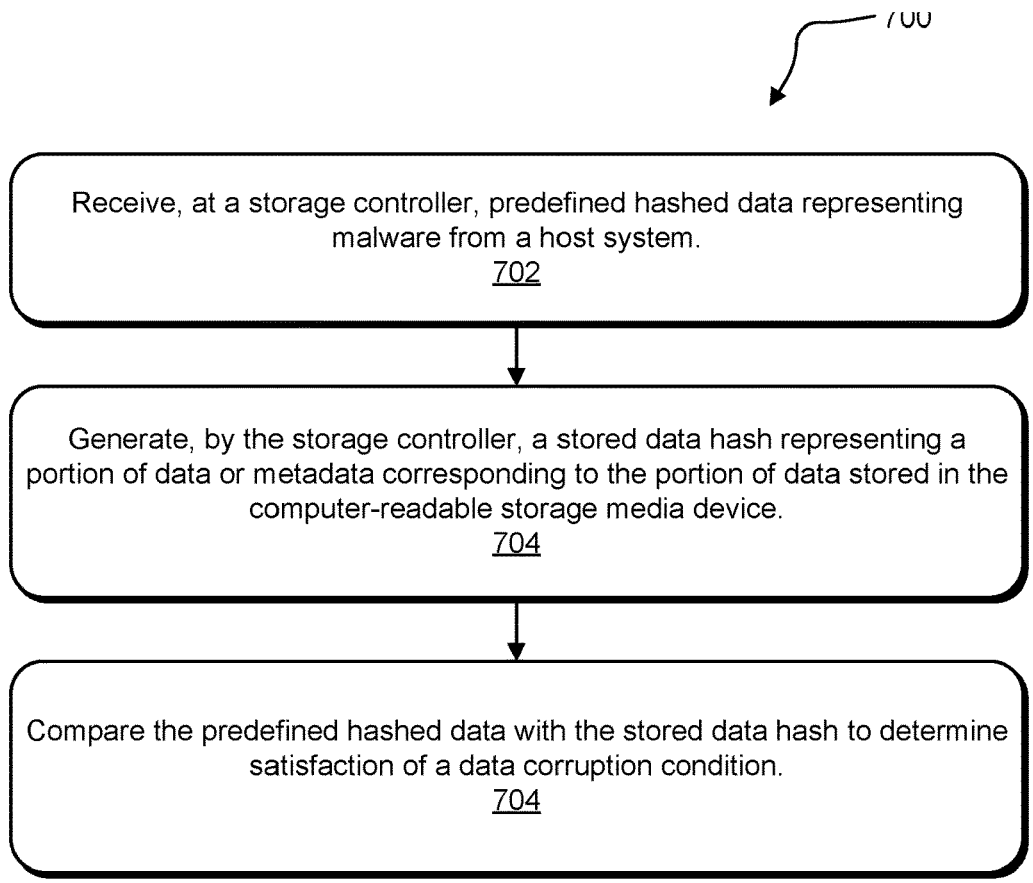
FIG. 7 illustrates example operations for detecting suspicious data.

FIG. 7 illustrates operations 700 for detecting suspicious data. Operations 700 may be implementations of the detecting operation 302. A receiving operation 702 receives, at a storage controller, predefined hashed data representing malware from a host system. A generating operation 704 generates, by the storage controller, a stored data hash representing a portion of data or metadata corresponding to the portion of data stored in the computer-readable storage media device. A comparing operation 706 compares, by the storage controller, the predefined hashed data with the stored data hash to determine satisfaction of a data corruption condition. In implementations, the satisfaction of the data corruption condition may be further based on whether a compressibility or change in compressibility of the portion of data satisfies elements of the data corruption condition (e.g., a predefined threshold or range for the compressibility or change in compressibility).

Figure 8:
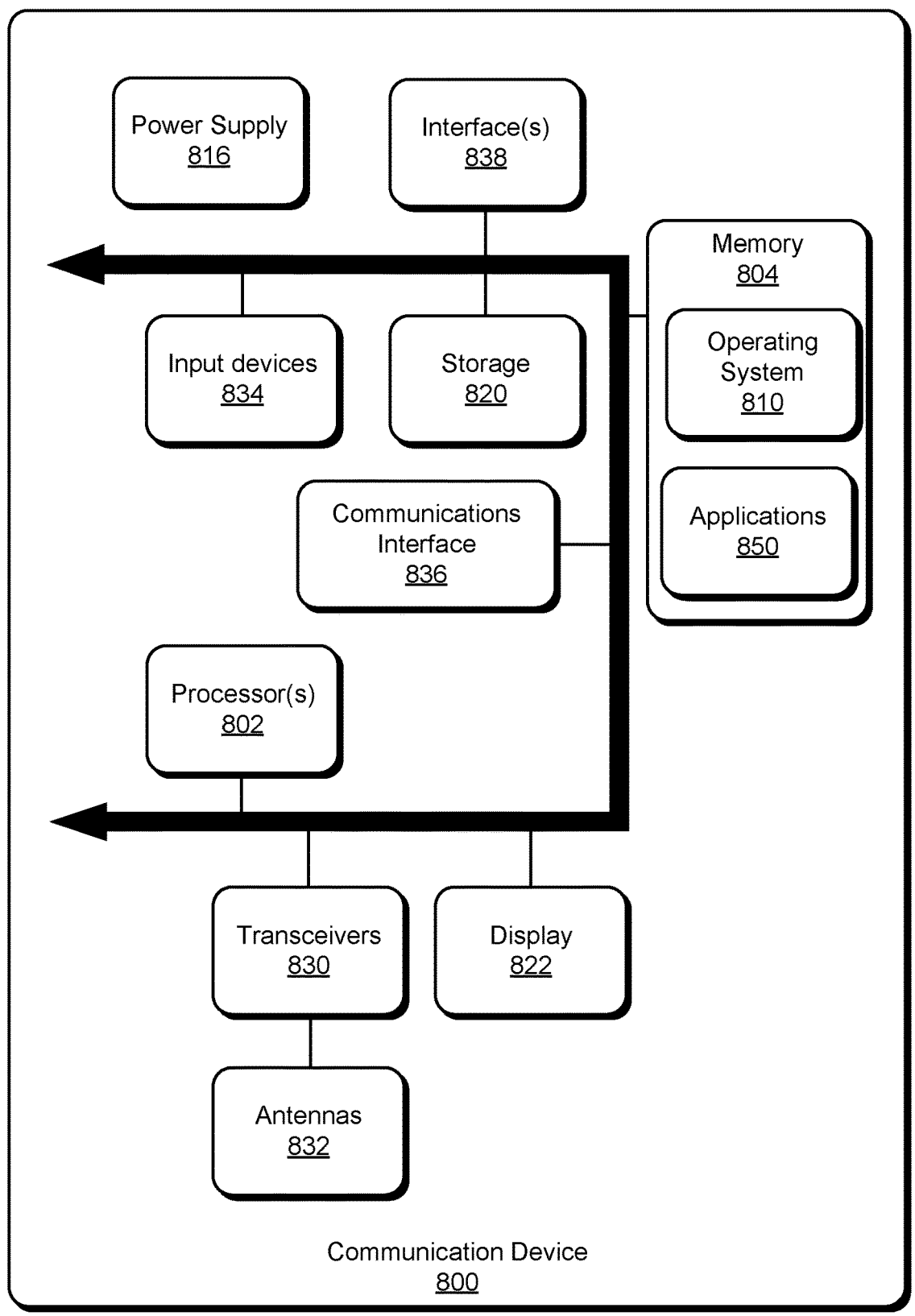
FIG. 8 illustrates an example computing device for implementing the features and operations of the described technology.

FIG. 8 illustrates an example computing device 800 for implementing the features and operations of the described technology. The computing device 800 may embody a remote-control device or a physical controlled device and is an example network-connected and/or network-capable device and may be a client device, such as a laptop, mobile device, desktop, tablet; a server/cloud device; an internet-of-things device; an electronic accessory; or another electronic device. The computing device 800 includes one or more processor(s) 802 and a memory 804. The memory 804 generally includes both volatile memory (e.g., RAM) and nonvolatile memory (e.g., flash memory). An operating system 810 resides in the memory 804 and is executed by the processor(s) 802. The host computing device 202 may be an implementation of computing device 800.

In an example computing device 800, as shown in FIG. 8, one or more modules or segments, such as applications 850, APIs, and/or a malware mitigator (e.g., in implementations in which the malware mitigator 208 is at least partially software-based) are loaded into the operating system 810 on the memory 804 and/or storage 820 and executed by processor(s) 802. The storage 820 may include one or more tangible storage media devices and may store snapshots, vulnerable data, suspicious data, malware, cached data, data hashes, predefined suspicious data hashes, predefined parameter thresholds, predefined ranges of parameter values, predefined numbers of snapshots, predefined frequencies of operations, data corruption conditions, metadata, locally and globally unique identifiers, requests, responses, and other data and be local to the computing device 800 or may be remote and communicatively connected to the computing device 800. The storage 820 may be an implementation of one or more of the storage devices 222A-C. In implementations, the storage device may include a storage controller and/or a malware mitigator (e.g., an implementation of the storage controller 210 and/or the malware mitigator 208).

The computing device 800 includes a power supply 816, which is powered by one or more batteries or other power sources and which provides power to other components of the computing device 800. The power supply 816 may also be connected to an external power source that overrides or recharges the built-in batteries or other power sources.

The computing device 800 may include one or more communication transceivers 830, which may be connected to one or more antenna(s) 832 to provide network connectivity (e.g., mobile phone network, Wi-Fi®, Bluetooth®) to one or more other servers and/or client devices (e.g., mobile devices, desktop computers, or laptop computers). The computing device 800 may further include a communications interface 836 (e.g., a network adapter), which is a type of computing device. The computing device 800 may use the communications interface 836 and any other types of computing devices for establishing connections over a wide-area network (WAN) or local-area network (LAN). It should be appreciated that the network connections shown are examples and that other computing devices and means for establishing a communications link between the computing device 800 and other devices may be used.

The computing device 800 may include one or more input devices 834 such that a user may enter commands and information (e.g., a keyboard or mouse). These and other input devices may be coupled to the server by one or more interfaces 838, such as a serial port interface, parallel port, or universal serial bus (USB). The one or more interfaces may be implementations of the communication interface 206. The computing device 800 may further include a display 822, such as a touch screen display.

The computing device 800 may include a variety of tangible processor-readable storage media and intangible processor-readable communication signals. Tangible processor-readable storage can be embodied by any available media that can be accessed by the computing device 800 and includes both volatile and nonvolatile storage media, removable and non-removable storage media. Tangible processor-readable storage media excludes communications signals (e.g., signals per se) and includes volatile and nonvolatile, removable and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 800. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Various software components described herein are executable by one or more processors, which may include logic machines configured to execute hardware or firmware instructions. For example, the processors may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Aspects of processors and storage may be integrated together into one or more hardware logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of a remote-control device and/or a physically controlled device implemented to perform a particular function. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service," as used herein, is an application program executable across one or multiple user sessions. A service may be available to one or more system components, programs, and/or other services. In some implementations, a service may run on one or more server computing devices.

The logical operations making up implementations of the technology described herein may be referred to variously as operations, steps, objects, or modules. Furthermore, it should be understood that logical operations may be performed in any order, adding or omitting operations as desired, regardless of whether operations are labeled or identified as optional, unless explicitly claimed otherwise or a specific order is inherently necessitated by the claim language.

An example method for mitigating effects of malware is provided, the method includes determining a compressibility of a portion of data, determining a data corruption condition is satisfied based on the determined compressibility, and modifying a retention policy for retention of stored snapshots associated with the portion of data in response to the satisfaction of the data corruption condition. The modifying the retention policy includes generating a first snapshot associated with the portion of data, prior to writing cached data associated with the portion of data, writing the cached data associated with the portion of data and generating a second snapshot associated with the portion of data, responsive to the writing.

Another example method of any preceding method is provided, wherein the modifying the retention policy further includes comparing the first snapshot with the second snapshot and modifying retention of at least a portion of one or more of a stored snapshot associated with the data and the portion of data based on the comparison.

Another example method of any preceding method is provided, wherein the retention policy is modified to adjust a frequency at which stored snapshots are generated.

Another example method of any preceding method is provided, wherein the retention policy is modified to adjust a number of stored snapshots.

Another example method of any preceding method is provided, the method further including receiving, at a storage controller, predefined hashed data representing malware or data affected by the malware from a host system, generating, by the storage controller, a stored data hash representing a portion of data or metadata corresponding to the portion of data, and comparing, by the storage controller, the predefined hashed data with the stored data hash, wherein the determination of satisfaction of the data corruption condition is further based on the comparison.

Another example method of any preceding method is provided, further including restoring the portion of data to a version represented in a prior snapshot based on one or more of the first snapshot and the second snapshot.

Another example method of any preceding method is provided, further including comparing the first snapshot and the second snapshot to determine a memory location at which data was modified based on the written cache, and transmitting the data location to an operating system of a host computing device based on the comparison.

An example data storage device is provided. The example data storage device includes a memory operable to store a portion of data and a storage controller. The storage controller is operable to determine a compressibility of the portion of data, determine a data corruption condition is satisfied based on the determined compressibility, and, in response to the satisfaction of the data corruption condition, modify a retention policy for retention of stored data. The storage controller modifies the retention policy for retention of stored data by being operable to generate a first snapshot associated with the portion of data, prior to writing of cached data associated with the portion of data stored in the storage controller, write the cached data associated with the portion of data from the storage controller to the memory, and generate a second snapshot associated with the portion of data, responsive to the writing.

Another example storage device of any preceding device is provided, wherein the storage controller is further operable to compare the first snapshot with the second snapshot and identify the memory based on the comparison.

Another example storage device of any preceding device is provided, wherein the storage controller is further operable to modify the retention policy to adjust a frequency at which stored snapshots are generated.

Another example storage device of any preceding device is provided, wherein the storage controller is further operable to modify the retention policy to adjust a number of stored snapshots.

Another example storage device of any preceding device is provided, wherein the storage controller is further operable to receive predefined hashed data representing malware or data affected by malware from a host system, generate a stored data hash representing a portion of data or metadata corresponding to the portion of data, and compare the predefined hashed data with the stored data hash, wherein the determination of satisfaction of the data corruption condition is further based on the comparison.

Another example storage device of any preceding device is provided, wherein the storage controller is further operable to restore the portion of data to a version represented in a prior snapshot based on one or more of the first snapshot and the second snapshot.

Another example storage device of any preceding device is provided, wherein the storage controller is further operable to modify the memory region based on one or more of the first snapshot and the second snapshot.

An example physical article of manufacture including one or more tangible computer-readable storage media, encoding computer-executable instructions for executing on a computing device a computer process including determining a compressibility of a portion of data stored in a storage device, determining a data corruption condition is satisfied based on the determined compressibility, and in response to the satisfaction of the data corruption condition, modifying a retention policy for retention of stored data. The modification of the retention policy for retention of stored data includes generating a first snapshot associated with the portion of data, prior to writing of cached data associated with the portion of data, writing the cached data associated with the portion of data, and generating a second snapshot associated with the portion of data, responsive to the writing.

Another example physical article of manufacture of any preceding article of manufacture is provided, the process further comprising malware mitigation data with the host computing via an application programming interface.

Another example physical article of manufacture of any preceding article of manufacture is provided, wherein the communicated malware mitigation data includes instructions from an anti-malware program executable in an operating system of the host computing device.

Another example physical article of manufacture of any preceding article of manufacture is provided, wherein the communicated malware mitigation data includes predefined hashed data representing malware or predefined hashed data representing data affected by malware. The process further includes generating a stored data hash representing a portion of data or metadata corresponding to the portion of data and comparing the predefined hashed data representing malware or predefined hashed data representing data affected by malware with the stored data hash, wherein the determination of satisfaction of the data corruption condition is further based on the comparison.

Another example physical article of manufacture of any preceding article of manufacture is provided, wherein the modifying of the retention policy is responsive to an instruction from an operating system executed by the host computing device.

Another example physical article of manufacture of any preceding article of manufacture is provided, wherein the process further includes comparing the first snapshot and the second snapshot to determine a memory location at which data was modified based on the written cache and transmitting the data location to an operating system of a host computing device based on the comparison.

An example system for mitigating effects of malware is provided. The system includes means for determining a compressibility of a portion of data, means for determining a data corruption condition is satisfied based on the determined compressibility, and means for modifying a retention policy for retention of stored snapshots associated with the portion of data in response to the satisfaction of the data corruption condition. The means for modifying the retention policy includes means for generating a first snapshot associated with the portion of data, prior to writing cached data associated with the portion of data, means for writing the cached data associated with the portion of data, and means for generating a second snapshot associated with the portion of data, responsive to the writing.

Another example system of any preceding system is provided, wherein the means for modifying the retention policy further includes means for comparing the first snapshot with the second snapshot and means for modifying retention of at least a portion of one or more of a stored snapshot associated with the data and the portion of data based on the comparison.

Another example system of any preceding system is provided, wherein the retention policy is modified to adjust a frequency at which stored snapshots are generated.

Another example system of any preceding system is provided, wherein the retention policy is modified to adjust a number of stored snapshots.

Another example system of any preceding system is provided, the system further including means for receiving, at a storage controller, predefined hashed data representing malware or data affected by the malware from a host system, means for generating, by the storage controller, a stored data hash representing a portion of data or metadata corresponding to the portion of data, and means for comparing, by the storage controller, the predefined hashed data with the stored data hash, wherein the determination of satisfaction of the data corruption condition is further based on the comparison.

Another example system of any preceding system is provided, further including means for restoring the portion of data to a version represented in a prior snapshot based on one or more of the first snapshot and the second snapshot.

Another example system of any preceding system is provided, further including means for comparing the first snapshot and the second snapshot to determine a memory location at which data was modified based on the written cache, and means for transmitting the data location to an operating system of a host computing device based on the comparison.

While this specification contains many specific implementation details, these should not be construed as limitations on the scope of any technologies or of what may be claimed, but rather as descriptions of features specific to particular implementations of the particular described technology. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Thus, particular implementations of the subject matter have been described. Other implementations are within the scope of the following claims. Nevertheless, it will be understood that various modifications can be made without departing from the spirit and scope of the recited claims.

As used herein, terms such as "substantially," "about," "approximately," or other terms of relative degree are interpreted as a person skilled in the art would interpret the terms and/or amount to a magnitude of variability of one or more of 1%, 2%, 3%, 4%, 5%, 6%, 7%, 8%, 9%, 10%, 11%, 12%, 13%, 14%, or 15% of a metric relative to the quantitative or qualitative feature described. For example, a term of relative degree applied to orthogonality suggests an angle may have a magnitude of variability relative to a right angle. When values are presented herein for particular features and/or a magnitude of variability, ranges above, ranges below, and ranges between the values are contemplated.

What is claimed is:

1. A method for mitigating effects of malware, comprising:
    determining a compressibility of a portion of data;
    determining a data corruption condition is satisfied based on the determined compressibility; and
    modifying a retention policy for retention of stored snapshots associated with the portion of data in response to the satisfaction of the data corruption condition, wherein modifying the retention policy comprises:
        generating a first snapshot associated with the portion of data, prior to writing cached data associated with the portion of data;
        writing the cached data associated with the portion of data;
        generating a second snapshot associated with the portion of data, responsive to the writing;
        comparing the first snapshot with the second snapshot; and
        modifying retention of at least a portion of one or more of a stored snapshot associated with the data based on the comparison.

2. The method of claim 1, wherein the modifying the retention policy further comprises:
    modifying retention of the portion of data based on the comparison.

3. The method of claim 1, wherein the retention policy is modified to adjust a frequency at which stored snapshots are generated.

4. The method of claim 1, wherein the retention policy is modified to adjust a number of stored snapshots.

5. The method of claim 1, further comprising:
    receiving, at a storage controller, predefined hashed data representing malware or data affected by the malware from a host system;
    generating, by the storage controller, a stored data hash representing a portion of data or metadata corresponding to the portion of data; and
    comparing, by the storage controller, the predefined hashed data with the stored data hash, wherein the determination of satisfaction of the data corruption condition is further based on the comparison.

6. The method of claim 1, further comprising:
    restoring the portion of data to a version represented in a prior snapshot based on one or more of the first snapshot and the second snapshot.

7. The method of claim 1, further comprising:
comparing the first snapshot and the second snapshot to determine a memory location at which data was modified based on the written cache; and
transmitting the data location to an operating system of a host computing device based on the comparison.

8. A data storage device, comprising:
a memory operable to store a portion of data; and
a storage controller operable to:
determine a compressibility of the portion of data;
determine a data corruption condition is satisfied based on the determined compressibility;
in response to the determined satisfaction of the data corruption condition, modify a retention policy for retention of stored data by being operable to:
generate a first snapshot associated with the portion of data, prior to writing of cached data associated with the portion of data stored in the storage controller;
write the cached data associated with the portion of data from the storage controller to the memory; and
generate a second snapshot associated with the portion of data, responsive to the writing;
restore the portion of data to a version represented in a prior snapshot based on one or more of the first snapshot and the second snapshot.

9. The data storage device of claim 8, wherein the storage controller is further operable to:
compare the first snapshot with the second snapshot; and
identify the memory based on the comparison.

10. The data storage device of claim 8, wherein the storage controller is further operable to modify the retention policy to adjust a frequency at which stored snapshots are generated.

11. The data storage device of claim 8, wherein the storage controller is further operable to modify the retention policy to adjust a number of stored snapshots.

12. The data storage device of claim 8, wherein the storage controller is further operable to:
receive predefined hashed data representing malware or data affected by malware from a host system;
generate a stored data hash representing a portion of data or metadata corresponding to the portion of data; and
compare the predefined hashed data with the stored data hash, wherein the determination of satisfaction of the data corruption condition is further based on the comparison.

13. The data storage device of claim 8, wherein the storage controller is further operable to:
modify the memory region based on one or more of the first snapshot and the second snapshot.

14. A physical article of manufacture including one or more tangible computer-readable storage media, encoding computer-executable instructions for executing on a computing device a computer process comprising:
determining a compressibility of a portion of data stored in a storage device;
determining a data corruption condition is satisfied based on the determined compressibility;
in response to the determined satisfaction of the data corruption condition, modifying a retention policy for retention of stored data by:
generating a first snapshot associated with the portion of data, prior to writing of cached data associated with the portion of data;
writing the cached data associated with the portion of data; and
generating a second snapshot associated with the portion of data, responsive to the writing;
comparing the first snapshot and the second snapshot to determine a memory location at which data was modified; and
transmitting the data location to an operating system of a host computing device.

15. The physical article of manufacture of claim 14, the process further comprising transmitting malware mitigation data to the host computing via an application programming interface.

16. The physical article of manufacture of claim 15, wherein the communicated malware mitigation data includes instructions from an anti-malware program executable in an operating system of the host computing device.

17. The physical article of manufacture of claim 15, wherein the communicated malware mitigation data includes predefined hashed data representing malware or predefined hashed data representing data affected by malware, the process further including:
generating a stored data hash representing a portion of data or metadata corresponding to the portion of data; and
comparing the predefined hashed data representing malware or predefined hashed data representing data affected by malware with the stored data hash, wherein the determination of satisfaction of the data corruption condition is further based on the comparison.

18. The physical article of manufacture of claim 14, wherein the modifying of the retention policy is responsive to an instruction from an operating system executed by the host computing device.

* * * * *